(12) United States Patent
Huss et al.

(10) Patent No.: US 10,355,889 B1
(45) Date of Patent: Jul. 16, 2019

(54) ADAPTIVE PATTERN FILTERING FOR CLOCK AND DATA RECOVERY TO MINIMIZE INTERACTION WITH DECISION FEEDBACK EQUALIZATION

(71) Applicant: Cadence Design Systems, Inc., San Jose, CA (US)

(72) Inventors: Scott David Huss, Cary, NC (US); Guillaume Fortin, Montreal (CA)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/376,037

(22) Filed: Dec. 12, 2016

(51) Int. Cl.
*H04L 25/03* (2006.01)
*H04L 12/26* (2006.01)

(52) U.S. Cl.
CPC ...... *H04L 25/03057* (2013.01); *H04L 43/028* (2013.01)

(58) Field of Classification Search
CPC ... H03D 1/00; H03D 3/24; H03L 7/06; H03L 7/07; H03L 7/08; H04B 1/10; H04L 7/00; H04L 7/02; H04L 12/26; H04L 25/03; H04L 25/03057; H04L 27/01; H04L 27/14; H04L 27/22; H04L 43/028
USPC ........ 327/156, 159; 375/226, 232, 233, 316, 375/324, 326, 329, 355
See application file for complete search history.

(56) References Cited

U.S. PATENT DOCUMENTS

| | | | |
|---|---|---|---|
| 9,160,582 B1 | 10/2015 | Huss et al. | |
| 9,432,176 B2* | 8/2016 | Yu | H04L 7/0025 |
| 2005/0157820 A1* | 7/2005 | Wongwirawat | H04L 25/0307 375/326 |
| 2005/0201491 A1* | 9/2005 | Wei | H04L 7/0337 375/326 |
| 2005/0265487 A1* | 12/2005 | Sou | G11B 20/10009 375/326 |
| 2013/0169328 A1* | 7/2013 | Shibasaki | H04L 7/0337 327/156 |
| 2014/0286381 A1* | 9/2014 | Shibasaki | H03L 7/089 375/226 |
| 2014/0286457 A1* | 9/2014 | Chaivipas | H04L 27/22 375/329 |
| 2015/0010047 A1* | 1/2015 | Zhong | H04L 7/0058 375/233 |

* cited by examiner

*Primary Examiner* — Shawkat M Ali
(74) *Attorney, Agent, or Firm* — Tarolli, Sundheim, Covell & Tummino LLP

(57) ABSTRACT

Systems and methods disclosed herein provide for adaptively applying pattern filters so that the edges are discarded only when the DFE feedback has adapted to levels that can corrupt the timing recovery. Embodiments of the systems and methods provide for a phase detector that selectively suppresses timing information based on the logic level states of the $Q_p$ and $Q_m$ data samples associated with the received signal.

20 Claims, 7 Drawing Sheets

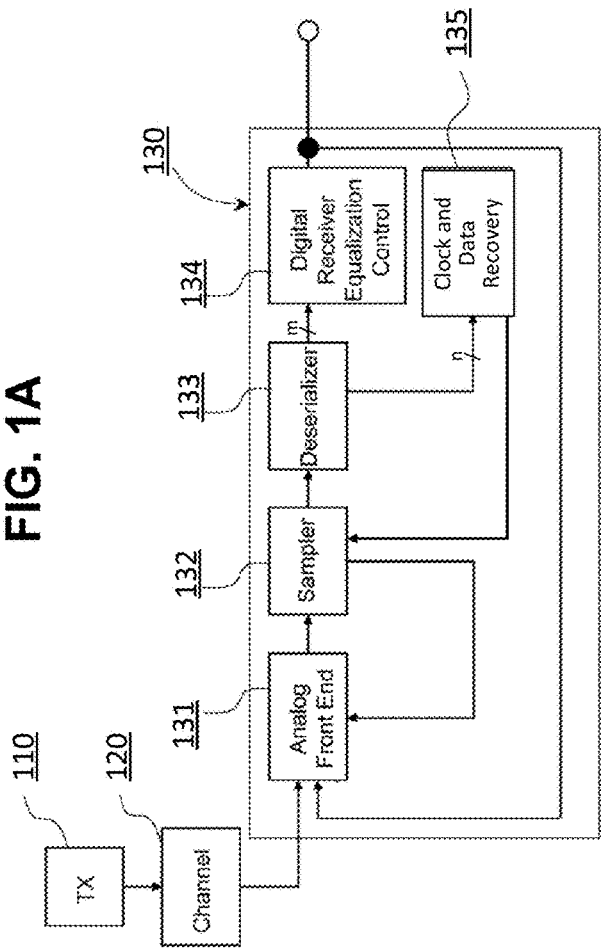
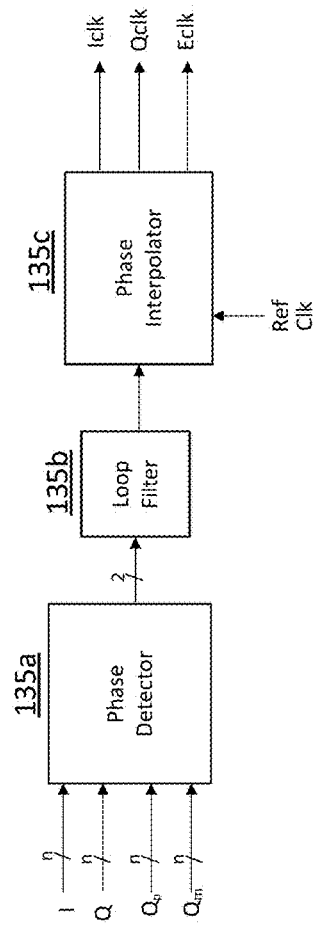
FIG. 1A
FIG. 1B

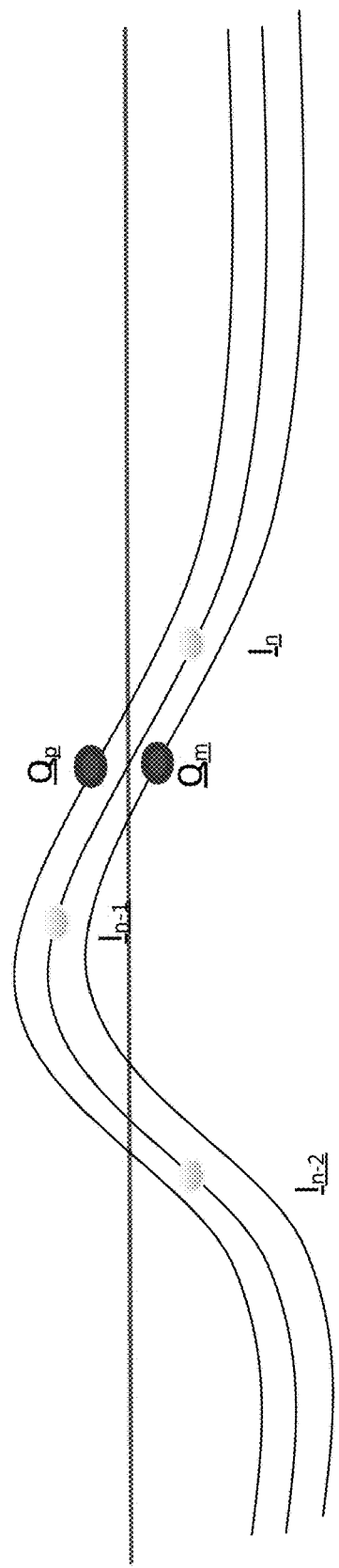

FIG. 5

| In_2 | In_1 | Op | Qm | Lo | Update |
|---|---|---|---|---|---|
| x | 1 | x | x | 1 | 0 |
| x | 0 | x | x | 0 | 0 |
| 1 | 1 | 0 | x | 0 | +1 |
| 1 | 1 | 1 | x | 0 | -1 |
| 0 | 0 | x | 0 | 1 | -1 |
| 0 | 1 | x | 1 | 1 | +1 |
| 0 | 1 | 1 | 0 | 0 | 0 |
| 0 | 1 | 0 | 0 | 0 | +1 |
| 1 | 0 | 1 | 1 | 0 | -1 |
| 1 | 0 | 1 | 0 | 1 | -1 |
| 1 | 0 | 1 | 1 | 1 | +1 |
| 1 | 0 | 1 | 0 | 1 | 0 |

ADAPTIVE PATTERN FILTERING FOR CLOCK AND DATA RECOVERY TO MINIMIZE INTERACTION WITH DECISION FEEDBACK EQUALIZATION

TECHNICAL FIELD

The present application relates to systems and methods for minimizing the interaction between clock and data recovery and decision feedback equalization through adaptive pattern filtering.

BACKGROUND

In various digital systems, signals can be transmitted from a transmitter to a receiver via a transmission channel. The transmission channel may be any suitable wired (or wireless) medium which links the transmitter to the receiver. However, in many instances (e.g., high data transmission speeds), the transmission channel becomes lossy. The transmission losses can be a result of, among other things, interference, attenuation, and delay in the channel. Further, such losses can also have considerable detrimental effect on the transmitted signal by the time it reaches the receiver. For example, sufficient amplitude and phase distortion of the transmitted signal may result in intersymbol interference (ISI) in the signal received at the receiver. ISI generally refers to the 'smearing' of a pulse or other symbol representing the logic state of one data bit to the degree such that it contributes to the content of one or more of the preceding (i.e., pre-cursor ISI) or succeeding (i.e., post-cursor ISI) data bits.

To guard against such detrimental effects, many serial receiver systems perform decision feedback equalization (DFE) on the received data. Such serial receiver systems may include (i) an analog front end that provides some continuous time linear equalization (CTLE), (ii) a sampler, a (iii) DFE that uses the quantized receive data to adaptively feedback a correction signal, and (iv) a timing recovery unit. The timing recovery unit may use edge samples of the signal to determine if the received timing is early or late (i.e., phase detection). This information may go to a digital loop filter, which outputs to a phase selector in order to generate a recovered clock. This recovered clock may then be used to sample (i.e., with the sampler) the input signal and process the received data. However, in certain instances, the phase detection may also be corrupted by the DFE correction. For example, if a large number of the edge locations that the timing recovery unit is locking to are predominately affected by the DFE feedback, the timing recovery unit will lock to the DFE feedback instead of the incoming signal. Further, because the timing of this DFE feedback is generated by the timing recovery itself, when the DFE feedback signal strength becomes significant relative to the incoming data, the timing recovery will diverge from the ideal sampling phase and frequency. Similarly, the timing recovery can also fail to lock (or lose lock) if, in addition to a strong DFE feedback, the transmission channel has high loss and dispersion, and the incoming signal is weak.

Previous solutions have used two methods to address this interaction between the timing recovery and the DFE feedback: (i) splitting the clock and data recovery of the timing recovery unit into two paths (i.e., one clock path and one data recovery path) and (ii) using a pattern filter to remove edges from the timing recovery unit that can be corrupted by the DFE. As regards to the first solution, the clock path does not include the DFE feedback, thereby avoiding this interaction. Further, a phase recovery block is used to align the two paths and to compensate for any slow drifts in the delay of the two paths. Unfortunately, the dual path architecture adds extra complexity to the circuitry and the phase recovery used to sample the data path must also have some mechanism to prevent interaction with the DFE. As regards to the second solution, the pattern filter removes the edges based on previous data bits. Although many of the edges of the incoming signals can be corrupted by the DFE feedback, some are not. Therefore, if pattern filtering is applied to selecting only those edges that are not corrupted by the DFE feedback, the above-discussed interaction problem can be avoided. However, filtering out these edges also reduces the updates into timing recovery, thereby lowering the bandwidth. Further, filtering also requires certain data sequences be avoided, i.e., those data sequences that predominately consist of a clock pattern (e.g., 010101 . . . ). Therefore, if the pattern filter only uses the previous data bits, these undesirable effects (e.g., lowered bandwidth and avoidance of certain data sequences) will persist even in the case where the transmission channel has low loss and the interaction is small enough such that the pattern filter was likely not needed.

Accordingly, there is a need for adaptively applying the pattern filters so that the edges are discarded only when the DFE feedback has adapted to levels that can corrupt the timing recovery.

BRIEF DESCRIPTION OF THE DRAWINGS

FIG. 1A illustrates a block diagram in accordance with an example embodiment of the present invention.

FIG. 1B illustrates a block diagram of the clock and data recovery utilized in FIG. 1A.

FIG. 3A illustrates an example of a signal that has shifted with a positive and negative DFE coefficient.

FIG. 5 illustrates a truth table implementing the adaptive filter in accordance with an example embodiment of the present invention.

DESCRIPTION OF EMBODIMENTS

Figure 2A:
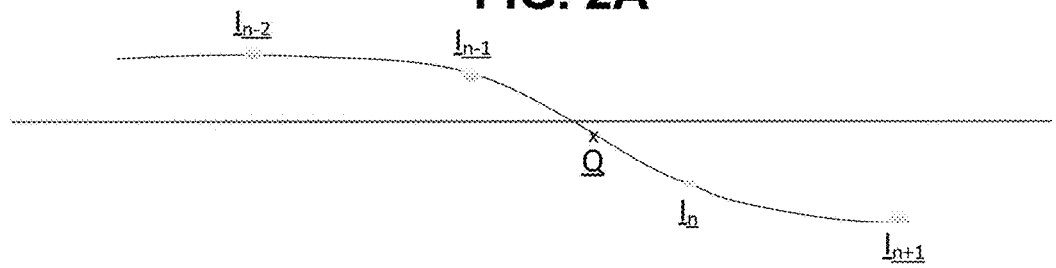
FIG. 2A illustrates a signal without DFE correction.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide systems and methods for adaptively applying pattern filters so that the edges are discarded only when the DFE feedback has adapted to levels that can corrupt the timing recovery. The systems and the methods herein address at least one of the problems discussed above.

According to an embodiment, a system for clock and data recovery of a signal received by a receiver includes: a phase detector, wherein the phase detector is configured to: receive, as inputs, (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and selectively suppress timing information associated with the received signal based on the first and second sample.

According to an embodiment, a method for clock and data recovery of a signal received by a receiver includes: receiving, at a phase detector of the receiver, inputs, the inputs including: (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and selectively suppressing, with the phase detector, timing information associated with the received signal based on the first and second sample.

According to an embodiment, a non-transitory computer-readable medium on which are stored instructions that are executable by a processor and that, when executed by the processor, cause the processor to perform a method for clock and data recovery of a signal received by a receiver, wherein the method includes: receiving, at a phase detector of the receiver, inputs, the inputs including: (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and selectively suppressing, with the phase detector, timing information associated with the received signal based on the first and second sample.

FIG. 1A illustrates a block diagram in accordance with an example embodiment of the present invention. As depicted in FIG. 1A, the block diagram includes a transmitter 110, a channel 120, and a receiver 130. In an embodiment, the receiver 130 includes an analog front end 131, a sampler 132, a de-serializer 133, a digital receiver equalization control 134, and a clock and data recovery unit 135 (e.g., timing recovery unit). The receiver 130 receives signals from the transmitter 110 via the channel 120. Specifically, the analog front end 131 of the receiver 130 receives the signals transmitted via the channel 120. In an embodiment, the analog front end 131 may include a variable gain amplifier (VGA) and/or an analog linear equalization (e.g., CTLE). Further, as depicted in the figure, the analog front end 131 also receives outputs from the digital receiver equalization control 134 and the sampler 132. Specifically, the analog front end 131 sums the weighted and delayed outputs from the sampler 132 to the received signal. The weight values are determined by the digital receiver equalization control 134. In an embodiment, the sampler 132 samples and quantizes the received signal in order to generate in-phase (I) and quadrature (Q) samples over a series of predetermined unit intervals (UI), with each Q sample being disposed between consecutive I samples preferably offset from each by ½ UI. Further, the sampler 132 samples the received signal based on a plurality of clock signals output from the clock and data recovery unit 135. In an embodiment, the sampler 132 sends the sampled data to (i) the analog front end 131 and (ii) the de-serializer 133. The de-serializer 133 de-serializes the quantized data and provides the de-serialized data to the digital receiver equalization controller 134 and the clock and data recovery unit 135. In an embodiment, the de-serializer 133 samples the quantized data at (i) the edge of the I sample and (ii) the center of the I sample. In an embodiment, the de-serialized data received by the digital receiver equalization controller 134 is de-serialized at a value different than the de-serialized data received by the clock and data recovery unit 135. For example, as depicted in the figure, (i) the digital receiver equalization controller 134 receives data that is de-serialized for m bits and (ii) the clock and data recovery unit 135 receives data that is de-serialized for n bits. In an embodiment, the digital receiver equalization controller 134 runs at a slower clock rate than the clock and data recovery 135. Accordingly, the data provided to the digital receiver equalization controller 134 will be de-serialized for a greater number of bits (e.g., 16-20 bits) than the data provided to the clock and data recovery 135 (e.g., 4 bits). In an embodiment, the digital receiver equalization controller 134 carries out predetermined control processing for the equalization utilized by the receiver based on data received from the de-serializer 133, and feeds back various equalization information to the analog front end 131 to perform the corrective operation. For example, the digital receiver equalization controller 134 sends the DFE weights, the VGA gain, and the CTLE settings to the analog front end 131. As a feedback equalizer, the sampler 132 generally makes a logic 1-or-0 decision on the sampled data. The decision is scaled and delayed and then fed back to the analog front end 131, where it is added back into the received data. Therefore, the DFE establishes a feedback loop where the decision is made in that loop. A notable advantage of a DFE is that since a decision is made on the data—either a logic 1 or a logic 0—the DFE effectively provides for substantially noiseless operation. Accordingly, the ISI in the channel 120 may be addressed without introducing additional noise in the process. Further, in an embodiment, the clock and data recovery 135 receives the I and Q data samples from the de-serializer 133 and, based on the I and Q data, determines if the sampler 132 is running too slow or too fast. Then, in order to correct the late or early clock rate of the sampler 132, the clock and data recovery 135 generates a plurality of clocks to provide to the sampler 132.

FIG. 1B illustrates a block diagram of the clock and data recovery utilized in FIG. 1A. As depicted in FIG. 1B, the clock and data recovery 135 includes a phase detector 135a, a loop filter 135b, and a phase interpolator. In an embodiment, the phase detector receives a plurality of de-serialized data samples from the de-serializer 133. For example, as depicted in the figure, the de-serializer 133 transmits the de-serialized I, Q, $Q_p$, and $Q_m$ data samples to the phase detector 135a. In an embodiment, the $Q_p$ data samples correspond to Q data samples shifted in the positive direction by a value associated with one of the previously discussed DFE weights (e.g., coefficients). Similarly, the $Q_m$ data samples correspond to Q data samples shifted in the negative direction by a value associated with the DFE coefficient. Based on the received data samples (i.e., I, Q, $Q_p$, and $Q_m$), the phase detector 135a will generate one of an early, late, or no update signal. For example, (i) to represent an early signal, the phase detector may generate a value of "01," (ii) to represent a late signal, the phase detector may generate a value of "10," and (iii) to represent that no update is need, the phase detector may generate a value of "00." In embodiment, the phase detector 135a performs this early/late analysis for each of the n de-serialized samples of the I, Q, $Q_p$, and $Q_m$ data samples. Accordingly, the phase detector 135a will provide n early/late signals to the loop filter 135b for processing. In an embodiment, the loop filter 135b determines if, over a certain period of time, the received early/late signals include a majority of early signal or a majority of late signals. Based on this determination, the loop filter 135b generates one of an early or late signal to transmit to the phase interpolator 135c. In an embodiment, the loop filter 135b may simply add the early/late signals over the period of time and, based on the sign of the sum, generate one of an increment or decrement signal. For example, assuming (i) the early signals were associated with a "+1," (ii) the late signals were associated with a "−1," and (iii) the signals that required no update were associated with a "0," if the sum of all of the early/late signals was associated with a positive sign (e.g., indicating a value greater than "0") it can be assumed the majority of the early/late signals were early signals. Similarly, if the sum of all of the early/late signals was associated with a negative sign (e.g., indicating a value less than "0") it can be assumed the majority of the early/late signals were late signals. This early/late signal is further filtered digitally. In an embodiment, the phase interpolator 135c modifies the phase of the plurality of clocks being provided to the sampler 132 based on the received early or late signal. For example, if the loop filter 135b transmits an early signal, the phase interpolator 135c decrements the phase of the plurality of clocks. In an embodiment, decrement implies that the phase of the sample clock is shifted earlier in time. Similarly, if the loop filter 135b transmits a late signal, the phase interpolator 135c increments the phase of the plurality of clocks. In an embodiment, increment implies that the phase of the sample clock is shifted later in time. Further, in an embodiment, as depicted in the figure, the plurality of clocks includes an Iclk clock, a Qclk clock, and an Eclk clock. In an embodiment, (i) the Iclk clock corresponds to the clock rate associated with the I data sample, (ii) the Qclk clock corresponds to the clock rate associated with the Q data sample, and (iii) the Eclk clock corresponds to the clock rate associated with the E (i.e., error) data sample. Further, as depicted in the figure, the phase interpolator 135c also receives a reference clock Ref Clk in order to generate and modify each of the Iclk clock, Qclk clock, and Eclk clock. In an embodiment, after modifying each of the clocks, the phase interpolator 135c then provides the modified clocks to the sampler 132.

FIG. 2A illustrates a signal without DFE correction. In an embodiment, FIG. 2A depicts an incoming data signal including a plurality of I data samples and a Q data sample. For example, the data signal includes I data samples $I_{n+1}$, $I_n$, $I_{n-1}$, and $I_{n-2}$, and data sample Q. In an embodiment, $I_{n+1}$, $I_n$, $I_{n-1}$, and $I_{n-2}$ are consecutive data samples. Further, each of the I data samples are separated from each other by 1 UI. For example, $I_{n+1}$ corresponds to the I data sample occurring 1 UI after $I_n$, $I_{n-1}$ corresponds to the I data sample occurring 1 UI before $I_n$, and $I_{n-2}$ corresponds to the I data sample occurring 1 UI before $I_{n-1}$. In an embodiment, FIG. 2A also includes a logic level cutoff. Any data samples above the logic level cutoff will be associated with a logical value of "1" and any data samples below the logic level cutoff will be associated with a logical value of "0." Accordingly, the I data samples $I_{n-2}$, $I_{n-1}$, $I_n$, and $I_{n+1}$ are associated with logical values "1," "1," "0," and "0," respectively. Similarly, because the Q data sample is below the logic level cutoff, it will also be associated with a logical "0." Further, as depicted in the figure, the Q data sample is positioned between the $I_{n-1}$ and the $I_n$ data samples. Accordingly, the Q data sample is occurring between a logic state transition (e.g., from a logical "1" to a logical "0"). In an embodiment, if a logic state transition (e.g., edge) occurs between consecutive I samples, the voltage levels in those I data samples (e.g., $I_{n-1}$ and $I_n$) will be sufficiently different to represent opposite logic states. Accordingly, the intervening Q data sample will reflect an intermediate voltage level. This intermediate voltage level may be on one side or the other of a cutoff between logic-high and logic-low voltage levels depending on the extent of delay encountered by the signal in traversing the channel. If the edge arrives late, the Q data sample's intermediate voltage level will still be on the same side of the logic level cutoff as the preceding I sample (e.g., $I_{n-1}$). In other words, the Q data sample was sampled too early relative to the data coming in. Similarly, if the edge arrives early, the Q data sample's intermediate voltage level will have moved to the other side of the logic level cutoff and therefore be on the same side as the succeeding I sample (e.g., $I_n$). In other words, the Q data sample was sampled too late relative to the data coming in. With regard to FIG. 2A, because the Q data sample is below the logic level cutoff, it is clear that (i) the edge arrived early and (ii) the Q data sample was sampled too late relative to the data coming in. Further, as described above, the incoming data signal in FIG. 2A does not include any DFE correction.

Figure 2B:
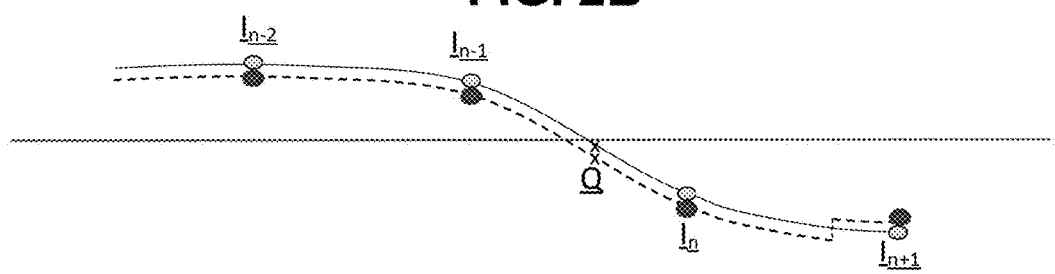
FIG. 2B illustrates the signal of FIG. 2A with DFE correction.

FIG. 2B illustrates the signal of FIG. 2A with DFE correction. In an embodiment, there are two types of DFE correction: early and late. Early DFE correction is defined as the correction occurring after the I data sample (e.g., $I_{n-1}$) but before the Q data sample. Early DFE correction is generally applied at a delay between 0 and ½ UI after the I data sample (e.g., $I_{n-1}$). For example, the early DFE correction can be applied at a ¼ UI delay after the $I_{n-1}$ data sample. Late DFE correction is defined as the correction occurring after the Q data sample. Late DFE correction is generally applied at a delay between ½ and 1 UI after the I data sample (e.g., $I_{n-1}$). In this example there is no DFE correction between samples $I_{n-1}$ and $I_n$ since there is no transition between $I_{n-2}$ and $I_{n-1}$. Accordingly, the early/late distinction for the DFE feedback delay would have no effect on the Q data sample.

Figure 2C:
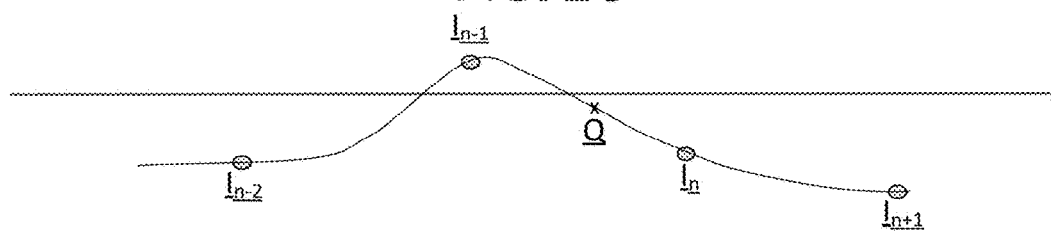
FIG. 2C illustrates another signal without DFE correction.

FIG. 2C illustrates another signal without DFE correction. In an embodiment, the I data samples $I_{n-2}$, $I_{n-1}$, and $I_n$ are associated with logical values "0," "1," and "0," respectively, and the Q data sample is associated with a logical "0." Similar to FIG. 2A, because the the Q data sample is associated with a logical "0," it is clear that (i) the edge arrived early and (ii) the Q data sample was sampled too late relative to the data coming in. Further, in addition to the edge between $I_{n-1}$ and $I_n$, the signal also includes an edge between $I_{n-2}$ and $I_{n-1}$ (e.g., from a logical "0" to a logical "1"). As discussed above, timing recovery may be detrimentally affected by the occurrence of excessive DFE (or other equalization) correction on a signal sample where an edge is detected. Specifically, if a transitional edge crossing the logic level cutoff is sampled, and that transitional edge reflects a DFE correction, there is ambiguity as to whether that crossing was actually due to proper signal content or instead due to the DFE correction.

Figure 2D:
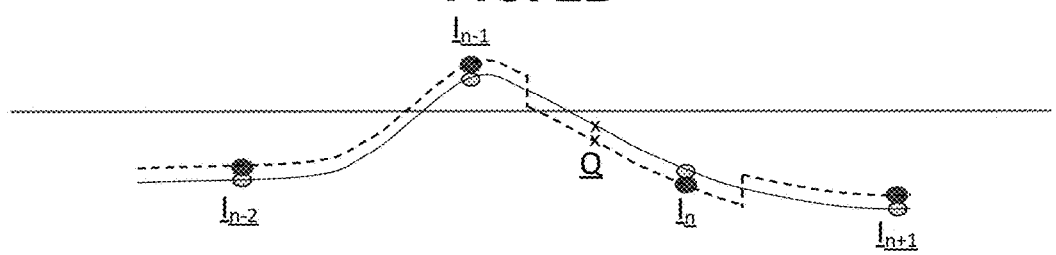
FIG. 2D illustrates the signal of FIG. 2C with an early DFE correction.

FIG. 2D illustrates the signal of FIG. 2C with an early DFE correction. As depicted by the "dashed" line, two DFE corrections are applied: (i) one right after the $I_{n-1}$ data sample and (ii) one right after the $I_n$ data sample. With regard to the first correction (e.g., one right after the $I_{n-1}$ data sample), the correction causes the signal to drop in amplitude to just above the logic level cutoff. Further, with regard to the second correction (e.g., one right after the $I_n$ data sample), the correction causes the signal to move slightly upwards but still remain beneath the logic level cutoff. Therefore, because neither of the corrections crossed the logic level cutoff, the clock and data recovery will likely maintain lock with the signal. However, if the DFE correction for either of the transitions was large enough to cross the logic level cutoff, the clock and data recovery would lock to the DFE transition instead of the incoming data. As depicted in the figure, with the early DFE correction, the zero crossing (i.e., transitional edge crossing the logic level cutoff) moved earlier in time, thereby causing the timing recovery to shift the samples earlier in time. For a lossy channel, this will increase the distortion due to the first post-cursor sample and, therefore, the magnitude of the DFE correction for the first DFE tap will need to be higher to correct it. This can cause the timing recovery to shift even earlier. As such, this positive feedback can cause the timing recovery to diverge.

Figure 2E:
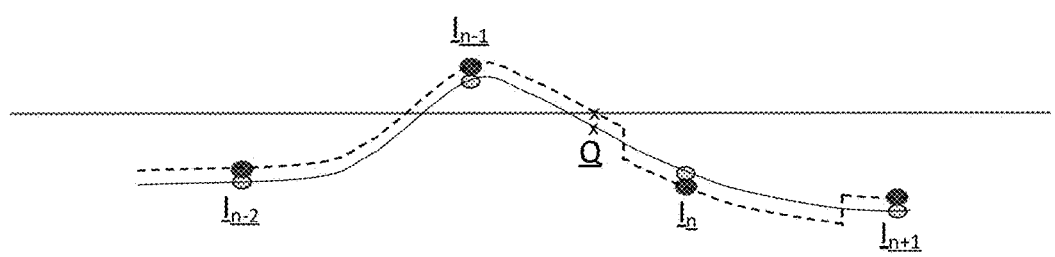
FIG. 2E illustrates the signal of FIG. 2C with a late DFE correction.

FIG. 2E illustrates the signal of FIG. 2C with a late DFE correction. As depicted by the "dashed" line, two DFE corrections are applied: (i) one right after the Q data sample and (ii) one right before the $I_{n+1}$ data sample. With regard to the first correction (e.g., one right after the Q data sample), the correction causes the signal to move slightly downwards. Further, with regard to the second correction (e.g., one right before the $I_{n+1}$ data sample), the correction causes the signal to move slightly upwards but still remain beneath the logic level cutoff. As depicted in the figure, with the late DFE correction, the zero crossing moved later in time, thereby causing the timing recovery to shift the samples later in time. For a lossy channel, this will decrease the distortion due to the first post-cursor sample and, therefore, the magnitude of the first DFE tap correction will need to be lower, making interaction with the timing recovery unlikely. However, this late DFE correction will result in more residual ISI due to pre-cursor distortion and is thus undesirable. For this reason, early DFE correction is generally better for the timing recovery.

As discussed above, because of the potential for corruption during the timing recovery, previous DFE system generally discarded timing information associated with the "010101 . . . " data patterns (e.g., FIGS. 2C-2E). However, as FIGS. 2D-2E depict, legitimate transitions in data occur at data samples affected by the DFE correction. Specifically, as long as the DFE corrections do not cause a transition across the logic level cutoff, the timing information for the "010101 . . . " data patterns is still usable. In an embodiment, if a DFE correction at a certain edge results in a transition across the logic level cutoff, then it can be assumed that adding the DFE correction to the incoming data signal would result in a logic level (e.g., "1") that is different than if it was subtracted (e.g., "0"). For example, for a "010101 . . . " data pattern, if (i) the Q data sample between the $I_{n-1}$ and $I_n$ data samples straddles the logic level cutoff and (ii) the DFE correction is large enough to cause a transition across the logic level cutoff, then adding the DFE correction to the Q data sample would result in a signal (e.g., $Q_p$) that is different in logic level than if the DFE correction was subtracted from the Q data sample (e.g., $Q_m$). Accordingly, if the logic levels associated with the $Q_p$ and $Q_m$ data samples are different, then it could be assumed that the DFE correction can corrupt the timing information and, therefore, the timing information should be discarded. On the other hand, if the $Q_p$ data sample and $Q_m$ data sample are associated with the same logic level, then it could be assumed that the DFE correction cannot corrupt the timing information and, therefore, the timing information is still usable.

FIG. 3A illustrates an example of a signal that has shifted with a positive and negative DFE coefficient. In other words, the signal, which is indicated by the $I_{n-2}$, $I_{n-1}$, and $I_n$ data samples, is (i) shifted upwards with the addition of a DFE correction coefficient to the signal and (ii) shifted downwards with the subtraction of the DFE correction coefficient from the signal. Further, as depicted in the figure, the $Q_p$ data sample is associated with the signal that was shifted upwards and the $Q_m$ data sample is associated with the signal that was shifted downwards. In addition, because the $Q_p$ data sample is associated with a logical level of "1" and the $Q_m$ data sample is associated with a logic level of "0," the timing information for this particular signal would likely be discarded to prevent corruption. In an embodiment, the $Q_p$ and $Q_m$ data samples can be determined for a particular signal with and without loop unrolling.

Figure 3B:
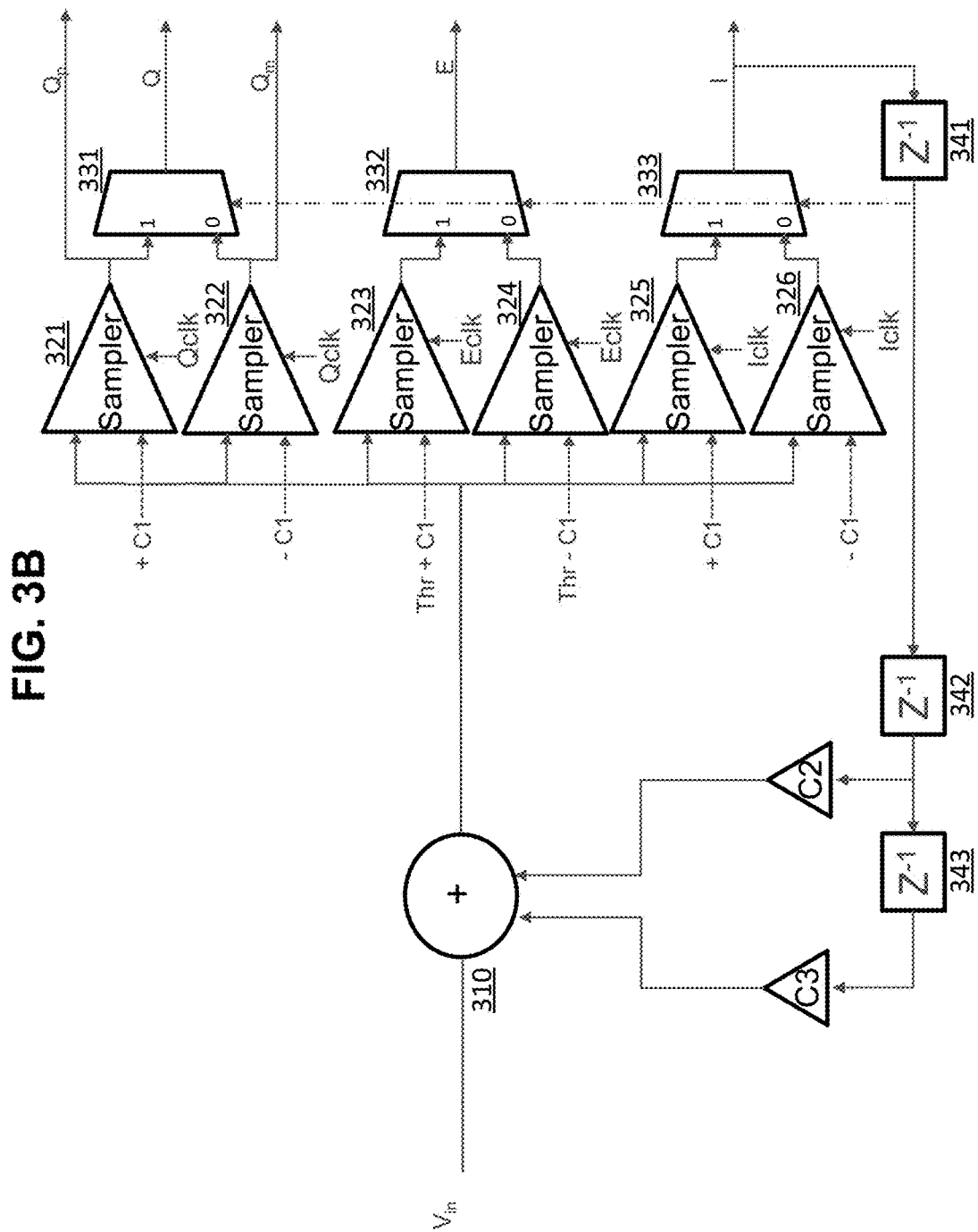
FIG. 3B illustrates a multi-tap DFE system with loop unrolling.

FIG. 3B illustrates a multi-tap DFE system with loop unrolling for the first DFE tap. Specifically, FIG. 3B depicts a 3-tap DFE. As depicted in the figure, the 3-tap DFE system includes an adder 310, samplers 321-326, multiplexers 331-333 and delay elements 341-343. In an embodiment, the system is generally used to sample and generate the Q, I, and E data samples that are provided to the de-serializer (e.g., 133a). Further, in an embodiment, the adder 310, DFE coefficient taps C2 and C3, and the delay elements 342 and 343 may be associated with the analog front end 131 in FIG. 1A. Similarly, in an embodiment, the samplers 321-326, the multiplexers 331-333, and the delay element 341 may be associated with the sampler 132 in FIG. 1A. As depicted in the figure, the adder 310 receives as inputs: (i) a voltage input $V_{in}$, (ii) an I data sample that has been delayed two times and is multiplied by the DFE coefficient tap C2, and (iii) an I data sample that has been delayed three times and is multiplied by the DFE coefficient tap C3. The adder 310 outputs a sum to a first input of each of the samplers 321-326. In an embodiment, the samplers 321 and 322 are used in combination with the multiplexer 331 to generate the Q data sample. In an embodiment, the sampler 321 receives, as a second input, a positive DFE coefficient+C1. Similarly, the sampler 322 receives, as a second input, a negative DFE coefficient−C1. Further, each of the samplers 321 and 322 receive the clock Qclk. In an embodiment, the clock Qclk may be provided by a phase interpolator (e.g., 135c). Further, in an embodiment, the samplers 321 and 322 may operate as comparators. In other words, the samplers 321 and 322 compare their respective first and second inputs and output a signal indicating which input is larger. In an embodiment, the output signal of the sampler 321 (e.g., $Q_p$) corresponds to the comparison between the positive DFE coefficient+C1 and the incoming signal, and the output signal of the sampler 322 (e.g., $Q_m$) corresponds to the comparison between the incoming signal and the negative DFE coefficient−C1. In an embodiment, the outputs of the samplers 321 and 322 are provided to a first and second input of the multiplexer 331, respectively. Accordingly, depending on a control signal (e.g., dashed line), the multiplexer 331 will output one of the first and second inputs as the Q data sample. In an embodiment, the control signal corresponds to a value of an I data sample that has been delayed by the delay element 341. In an embodiment, because the loop unrolled system already provides the $Q_p$ and $Q_m$ data samples as outputs of the samplers 321 and 322, those outputs can be utilized and provided to the phase detector 135a to determine if the DFE correction can corrupt the timing information. In an embodiment, as depicted in the figure, the E and I data samples are generated similar to the Q data sample. However, unlike the samplers 321 and 322, (i) the samplers 323 and 324 are clocked at the clock Eclk and (ii) the samplers 325 and 326 are clocked at the clock Iclk. In an embodiment, the Eclk and Iclk clocks may also be provided by the phase interpolator (e.g., 135c).

Figure 3C:
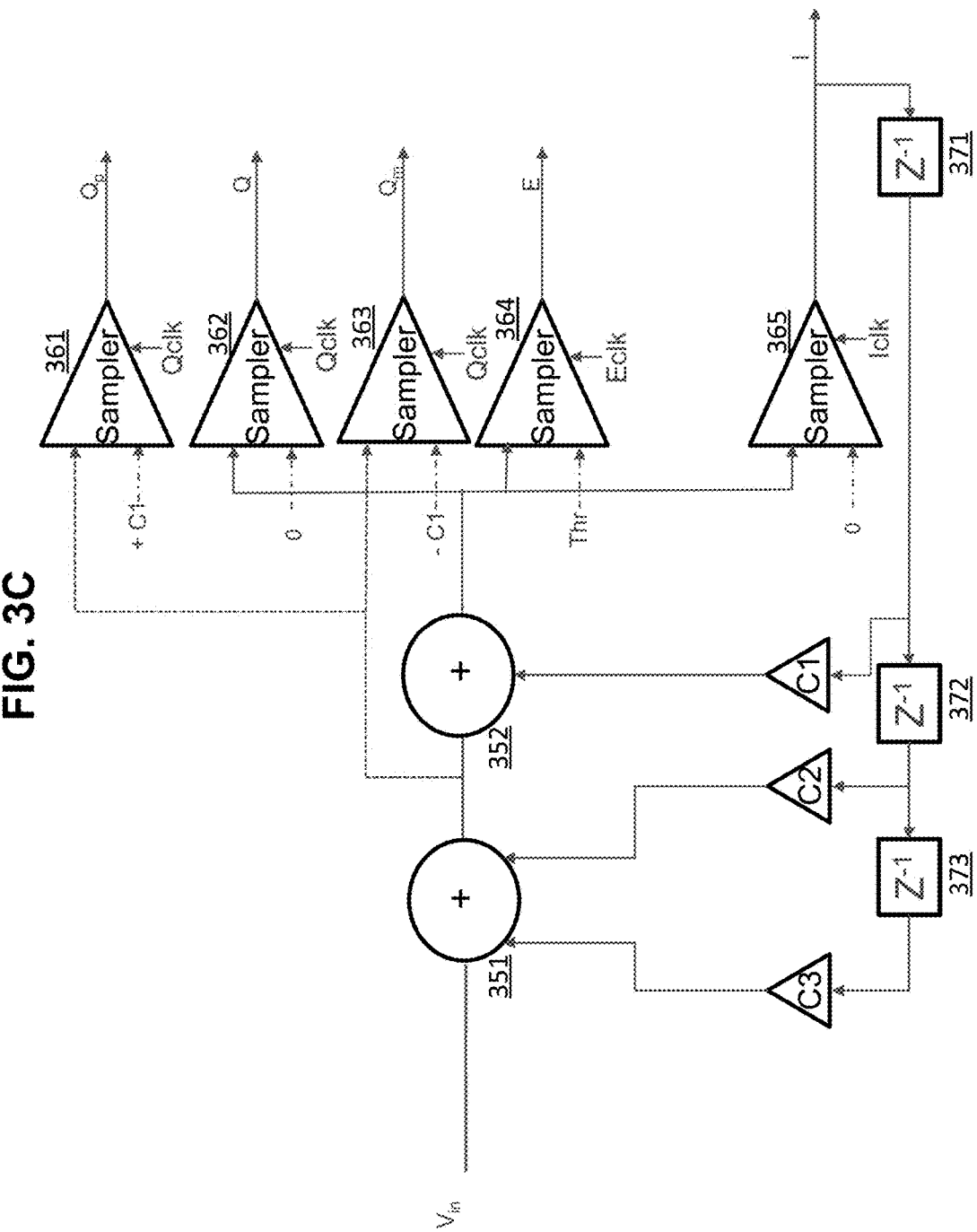
FIG. 3C illustrates a multi-tap DFE system without loop unrolling.

FIG. 3C illustrates a multi-tap DFE system without loop unrolling. Specifically, FIG. 3C depicts a 3-tap DFE system. As depicted in the figure, the 3-tap DFE system includes adders 351 and 352, samplers 361-365, and delay elements 371-373. Accordingly, unlike the loop unrolled system discussed above, this system does not include any multiplexers and, therefore, does not include a pair of samplers for each of the data samples I, Q, and E. Instead, a single sampler is provided to generate each of the data samples I, Q, and E. Further, in an embodiment, additional samplers are provided to generate the $Q_p$ and $Q_m$ data samples. In an embodiment, the adders 351 and 352, the DFE coefficient taps C1, C2 and C3, and the delay elements 342 and 343 may be associated with the analog front end 131 in FIG. 1A. Similarly, in an embodiment, the samplers 361-365 and the delay element 371 may be associated with the sampler 132 in FIG. 1A. In an embodiment, the samplers 362, 363, and 365 (i.e., corresponding to Q, E, and I data samples, respectively) each receive, at a first input, the output of the adder 352, and, at a second input, a threshold voltage. Further, the samplers 362, 363, and 365 are clocked at Qclk, Eclk, and Iclk, respectively. In addition, similar to the samplers 321-326, the samplers 362, 364, and 365 operate as comparators and, therefore, output a signal indicating which of the first and second inputs is larger. In an embodiment, the outputs of the samplers 362, 364, and 365 correspond to the Q, E, and I data samples, respectively. Further, as depicted in the figure, (i) the sampler 361 receives, at a first input, the output of the adder 351, and, at a second input, the positive DFE coefficient+C1, and (ii) the sampler 363 receives, at a first input, the output of the adder 351, and, at a second input, the negative DFE coefficient−C1. In an embodiment, each of the samplers 361 and 363 is clocked at Qclk. Further, the output signal of the sampler 361 (e.g. $Q_p$) corresponds to a comparison between the positive DFE coefficient+C1 and the incoming signal, and the output signal of the sampler 363 (e.g., $Q_m$) corresponds to a comparison between the incoming signal and the negative DFE coefficient−C1. Accordingly, a multi-tap DFE system without loop unrolling may also provide the $Q_p$ and $Q_m$ data samples.

Figure 4:
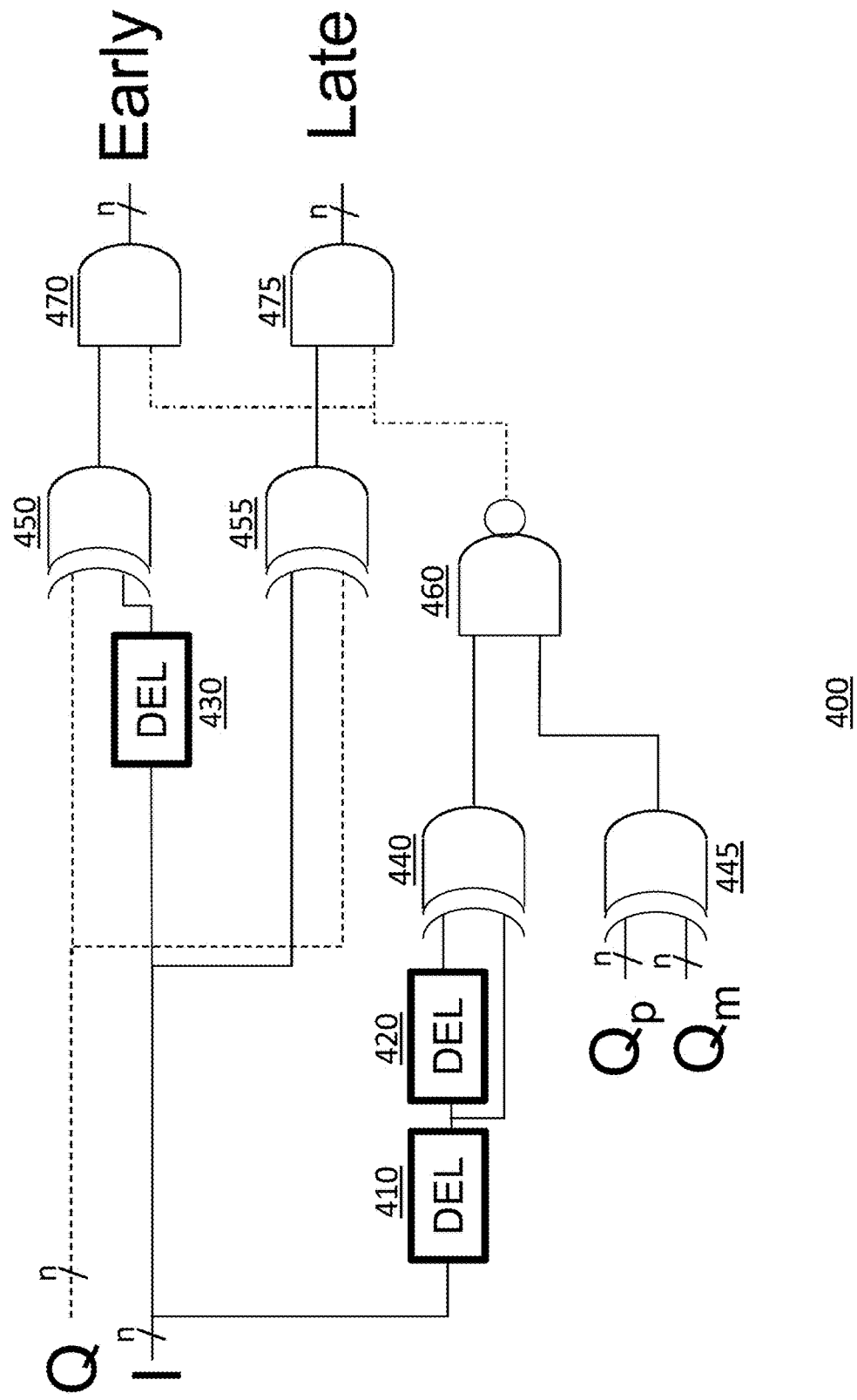
FIG. 4 illustrates a phase detector in accordance with an example embodiment of the present invention.

FIG. 4 illustrates a phase detector in accordance with an example embodiment of the present invention. In an embodiment, as depicted in the figure, phase detector 400 includes delay elements 410, 420, and 430, XOR logic gates 440, 445, 450, and 455, NAND logic gate 460, and AND logic gates 470 and 475. In an embodiment, the phase detector 400 is utilized to determine if the incoming data is early or late. In an embodiment, phase detector 400 may correspond to the phase detector 135a of FIG. 1B. Further, as depicted in FIG. 4, the phase detector 400 (i) receives, as inputs, the de-serialized I, Q, $Q_p$, and $Q_m$ data samples and (ii) transmits, as outputs, a plurality of early/late signals. In an embodiment, the de-serialized I, Q, $Q_p$, and $Q_m$ data samples may be received from a de-serializer (e.g., 133 of FIG. 1A), and the plurality of early/late signals may be transmitted to a loop filter (e.g., 135b of FIG. 1B). In an embodiment, the XOR logic gate 450 can be utilized to determine if an early transition occurred between $I_{n-1}$ and $I_n$. For example, the XOR logic gate 450 receives, at a first input, a de-serialized Q sample, and, at second input, a de-serialized I sample that has been delayed by 1 UI by delay element 430 (i.e., $I_{n-1}$). Accordingly, if the first and second outputs correspond to different logic levels, the XOR logic gate 450 will output a logical "1." Otherwise, the XOR logic gate 450 will output a logical "0." In other words, if the $I_n$ i and Q data samples correspond to different logical levels, it can be assumed that the transition from $I_{n-1}$ to $I_n$ (e.g., from "0" to "1" or "1" to "0") was early. Similarly, in an embodiment, the XOR logic gate 455 can be utilized to determine if a late transition occurred between $I_{n-1}$ and $I_n$. For example, the XOR logic gate 455 receives, at a first input, the de-serialized Q sample, and, at second input, the de-serialized I sample (i.e., $I_n$). Accordingly, if the first and second outputs correspond to different logic levels, the XOR logic gate 455 will output a logical "1." Otherwise, the XOR logic gate 455 will output a logical "0." In other words, if the $I_n$ and Q data samples correspond to different logical levels, it can be assumed that the transition from $I_{n-1}$ to $I_n$ was late.

In an embodiment, the XOR logic gate 440 can be utilized to determine if a transition occurred between $I_{n-2}$ and $I_{n-1}$. For example, the XOR logic gate 440 receives, at a first input, a de-serialized I sample that has been delayed by 1 UI by delay element 410 (i.e., $I_{n-1}$), and, at second input, a de-serialized I sample that has been delayed by 2 UI by delay elements 410 and 420 (i.e., $I_{n-2}$). Accordingly, if the first and second outputs correspond to different logic levels, the XOR logic gate 440 will output a logical "1." Otherwise, the XOR logic gate 440 will output a logical "0." In other words, if the $I_{n-2}$ and $I_{n-1}$ data samples correspond to different logical levels, it can be assumed that there was a transition from $I_{n-2}$ to $I_{n-1}$.

Further, in an embodiment, the XOR logic gate 445 can be utilized to determine if the $Q_p$ and $Q_m$ data samples correspond to different logic levels. For example, the XOR logic gate 445 receives, at a first input, a de-serialized $Q_p$ data sample and the $Q_m$ data sample, and, at second input, a de-serialized $Q_m$ data sample. Accordingly, if the first and second outputs correspond to different logic levels, the XOR logic gate 445 will output a logical "1." Otherwise, the XOR logic gate 440 will output a logical "0."

Accordingly, in an embodiment, based on the outputs of the XOR logic gates 440 and 445, the NAND logic gate 460 and the AND logic gates 470 and 475 can be utilized to suppress potentially corrupted timing information. For example, if (i) the incoming data signal includes a transition between $I_{n-2}$ and $I_{n-1}$ and another transition between $I_{n-1}$ and $I_n$ (e.g., "010" or "101") and (ii) the $Q_p$ and $Q_m$ data samples correspond to different logic levels, both of the XOR logic gates 440 and 445 will output a logical "1." As such, based on the outputs from the XOR logic gates 440 and 445, the NAND logic gate 460 will output a logical "0" to an input of each of the AND logic gates 470 and 475. Therefore, both of the AND logic gates 470 and 475 would output a logical "0," which indicates that this timing information will not be used by further processes (e.g., loop filter, phase interpolator).

On the other hand, if the $Q_p$ and $Q_m$ data samples correspond to the same logic level, then the XOR logic gate 445 will output a logical "0." As such, the NAND logic gate 460 will output a logical "1," which indicates that the timing information will depend on the outputs of the XOR logic gates 450 and 455. For example, if there was an early transition from $I_{n-1}$ to $I_n$, the XOR logic gate 450 would output a logical "1" and the XOR logic gate 455 would output a logical "0." As such, the AND logic gate 470 would output a logical "1" and the AND logic gate 475 would output a logical "0". Similarly, if there was a late transition from $I_{n-1}$ to $I_n$, the XOR logic gate 450 would output a logical "0" and the XOR logic gate 455 would output a logical "1." As such, the AND logic gate 470 would output a logical "0" and the AND logic gate 475 would output a logical "1."

In an embodiment, the various units and components forming the phase detector 400 may be suitably implemented in hardware, software (by programmable implementation in computer readable memory for execution in one or more computer processors), or a combination of both. The choice of implementation will depend on the particular requirements of the intended application, and any suitable measures known in the art may be employed consistent with the disclosures herein.

FIG. 5 illustrates a truth table implementing the adaptive filter in accordance with an example embodiment of the present invention. Specifically, as depicted in FIG. 5, the truth table includes a variety of combinations of the $I_{n-2}$, $I_{n-1}$, $I_n$, $Q_p$, and $Q_m$ data samples as well as an update value associated with each of the combinations. In an embodiment, an update value of "0" indicates that the timing information associated with the specific combination will not be used (e.g., no update). Further, an update value of "+1" indicates that the transition from $I_{n-1}$ to $I_n$ was early and, therefore, the phase needs to be modified accordingly, e.g., decremented. Similarly, an update value of "−1" indicates that the transition from $I_{n-1}$ to $I_n$ was late and, therefore, the phase needs to be incremented accordingly. As depicted in the figure, the first row includes a combination in which $I_{n-1}$ and $I_n$ both correspond to a logical "1." Therefore, because there is no transition between $I_{n-1}$ and $I_n$, there could be no early or late transitions and, thus, the update would be "0." In an embodiment, an update value of logical "0" corresponds to output values of logical "0" for the AND logic gates 470 and 475 in phase detector 400. As regards to the second row, it includes a combination in which $I_{n-1}$ and $I_n$ both correspond to a logical "0." As such, similar to the first row, the update value for the second row will also be "0." As regards to the third row, it includes a combination in which there is a transition from $I_{n-1}$ to $I_n$ (i.e., "1" to "0"). Further, in an embodiment, because $I_{n-1}$ corresponds to a logical "1," the loop unrolling system (e.g., FIG. 3B) will select $Q_p$ (i.e., "0") as the Q data sample. Accordingly, utilizing the phase detector 400 of FIG. 4, it can be determined that there was an early transition from $I_{n-1}$ to $I_n$. As such, the update value for the third row will be a "+1." As regards to the fourth row, it includes a combination in which the transition from $I_{n-1}$ to $I_n$ is also from "1" to "0." Therefore, the loop unrolling system (e.g., FIG. 3B) will also select $Q_p$ (i.e., "1") as the Q data sample. Accordingly, utilizing the phase detector 400 of FIG. 4, it can be determined that there was a late transition from $I_{n-1}$ to $I_n$. As such, the update value for the fourth row will be "−1." As regards to the fifth row, it includes a combination in which the transition from $I_{n-1}$ to $I_n$ is from "0" to "1." Therefore, the loop unrolling system (e.g., FIG. 3B) will select $Q_m$ (i.e., "0") as the Q data sample. Accordingly, utilizing the phase detector 400 of FIG. 4, it can be determined that there was a late transition from $I_{n-1}$ to $I_n$. As such, the update value for the fifth row will be "−1." As regards to the sixth row, it includes a combination in which the transition from $I_{n-1}$ to $I_n$ is also from "0" to "1." Therefore, the loop unrolling system (e.g., FIG. 3B) will also select $Q_m$ (i.e., "1") as the Q data sample. Accordingly, utilizing the phase detector 400 of FIG. 4, it can be determined that there was an early transition from $I_{n-1}$ to $I_n$. As such, the update value for the sixth row will be "+1." As regards to the seventh row, it includes a combination in which there is a transition from $I_{n-2}$ to $I_{n-1}$ (i.e., "0" to "1") as well as a transition from $I_{n-1}$ to $I_n$ (i.e., "1" to "0"). Further, the seventh row also includes $Q_p$ and $Q_m$ data samples of different logic levels. As such, the phase detector 400 of FIG. 4 will suppress the timing information associated with this combination and, therefore, the update value will be "0." As regards to the eighth to eleventh rows, the respective combinations also include a transition from $I_{n-2}$ to $I_{n-1}$ as well as a transition from $I_{n-1}$ to $I_n$. However, unlike the seventh row, the $Q_p$ and $Q_m$ data samples associated with each of the eighth to eleventh rows are of the same logic level. Accordingly, the timing information associated with these combinations will not be suppressed. Lastly, similar to the seventh, the twelfth row includes a combination in which (i) there is a transition from $I_{n-2}$ to $I_{n-1}$ as well as a transition from $I_{n-1}$ to $I_n$ and (ii) the $Q_p$ and $Q_m$ data samples correspond to different logic levels. As such, the phase detector 400 of FIG. 4 will suppress the timing information associated with this combination and, therefore, the update value will be "0."

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of the Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

What is claimed is:

1. A system for clock and data recovery of a signal received by a receiver, the system comprising:
  a phase detector, wherein the phase detector is configured to:
    receive, as inputs, (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and
    selectively discard timing information associated with the received signal upon determining that the at least one first and second samples correspond to different logic levels, wherein the timing information indicates whether a phase of at least one clock sampling the received signal is one of early or late.

2. The system of claim 1, wherein the phase detector discards the timing information upon determining that the received signal includes: (i) a first logic level transition between a current I sample $I_n$ and a first preceding I sample $I_{n-1}$ and (ii) a second logic level transition between the $I_{n-1}$ sample and a second preceding I sample $I_{n-2}$, wherein $I_n$, $I_{n-1}$, and $I_{n-2}$ are offset from one another by at least one unit interval (UI).

3. The system of claim 1, wherein the phase detector is further configured to:
generate, based on the inputs, phase information associated with the received signal, wherein the phase information includes one of (i) an early logic level transition between a first preceding I sample $I_{n-1}$ and a current I sample $I_n$ and (ii) a late logic level transition between the $I_{n-1}$ and $I_n$ samples, wherein $I_n$ and $I_{n-1}$ are offset from one another by at least one unit interval (UI).

4. The system of claim 3, wherein the phase detector is further configured to:
output the phase information to a loop filter, wherein the loop filter is configured to filter the phase information.

5. The system of claim 4, further comprising:
a phase interpolator, wherein the phase interpolator is configured to:
modify a plurality of clocks based on the filtered phase information; and
output the plurality of modified clocks to a sampler.

6. The system of claim 5, wherein the plurality of clocks includes at least one of (i) an in-phase (I) clock and (ii) a quadrature (Q) clock.

7. The system of claim 1, wherein the at least one first and second samples are generated from a sampler including loop unrolling.

8. The system of claim 1, wherein (i) the at least one first sample is generated by a first sampler and (ii) the at least one second sample is generated by a second sampler.

9. The system of claim 1, wherein each of the inputs are de-serialized.

10. A method for clock and data recovery of a signal received by a receiver, the method comprising:
receiving, at a phase detector of the receiver, inputs, the inputs including: (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and
selectively discarding, with the phase detector, timing information associated with the received signal upon determining that the at least one first and second samples correspond to different logic levels, wherein the timing information indicates whether a phase of at least one clock sampling the received signal is one of early or late.

11. The method of claim 10, wherein the phase detector discards the timing information upon determining that the received signal includes: (i) a first logic level transition between a current I sample $I_n$ and a first preceding I sample $I_{n-1}$ and (ii) a second logic level transition between the $I_{n-1}$ sample and a second preceding I sample $I_{n-2}$, wherein $I_n$, $I_{n-1}$, and $I_{n-2}$ are offset from one another by at least one unit interval (UI).

12. The method of claim 10, further comprising:
generating, with the phase detector, phase information associated with the received signal based on the inputs, wherein the phase information includes one of (i) an early logic level transition between a first preceding I sample $I_{n-1}$ and a current I sample $I_n$ and (ii) a late logic level transition between the $I_{n-1}$ and $I_n$ samples, wherein $I_n$ and $I_{n-1}$ are offset from one another by at least one unit interval (UI).

13. The method of claim 12, further comprising:
outputting, with the phase detector, the phase information to a loop filter, wherein the loop filter is configured to filter the phase information.

14. The method of claim 13, further comprising:
modifying, with a phase interpolator, a plurality of clocks based on the filtered phase information; and
outputting, with the phase interpolator, the plurality of modified clocks to a sampler.

15. The method of claim 10, wherein the at least one first and second samples are generated from a sampler including loop unrolling.

16. The method of claim 10, wherein (i) the at least one first sample is generated by a first sampler and (ii) the at least one second sample is generated by a second sampler.

17. A non-transitory computer-readable medium on which are stored instructions that are executable by a processor and that, when executed by the processor, cause the processor to perform a method for clock and data recovery of a signal received by a receiver, the method comprising:
receiving, at a phase detector of the receiver, inputs, the inputs including: (i) at least one in-phase (I) sample of the received signal, (ii) at least one quadrature (Q) sample of the received signal, (iii) at least one first sample representing a sum of an equalization coefficient and the received signal, and (iv) at least one second sample representing a difference between the received signal and the equalization coefficient; and
selectively discarding, with the phase detector, timing information associated with the received signal upon determining that the at least one first and second samples correspond to different logic levels, wherein the timing information indicates whether a phase of at least one clock sampling the received signal is one of early or late.

18. The non-transitory computer-readable medium of claim 17,
wherein the phase detector discards the timing information upon determining that the received signal includes: (i) a first logic level transition between a current I sample $I_n$ and a first preceding I sample $I_{n-1}$ and (ii) a second logic level transition between the $I_{n-1}$ sample and a second preceding I sample $I_{n-2}$, wherein $I_n$, $I_{n-1}$, and $I_{n-2}$ are offset from one another by at least one unit interval (UI).

19. A receiver, comprising:
an analog front end, wherein the analog front end is configured to receive a signal from a transmitter;
a sampler, wherein the sampler is configured to sample and quantize the received signal to generate at least one in-phase (I) sample and at least one quadrature (Q) sample of the received signal;
a de-serializer, wherein the de-serializer is configured to de-serialize the sampled I and Q samples; and
a clock and data recovery circuit, wherein the clock and data recovery circuit is configured to:
receive, as inputs, (i) the generated I and Q samples, (ii) at least one first sample representing a sum of an equalization coefficient and the received signal, and (iii) at least one second sample representing a difference between the received signal and the equalization coefficient, and
selectively discard timing information associated with the received signal upon determining that the at least one first and second samples correspond to different logic levels, wherein the timing information indicates whether a phase of at least one clock sampling the received signal is one of early or late.

20. The receiver of claim 19, wherein the clock and data recovery circuit suppresses the timing information upon determining that the received signal includes: (i) a first logic level transition between a current I sample $I_n$ and a first preceding I sample $I_{n-1}$ and (ii) a second logic level transition between the $I_{n-1}$ sample and a second preceding I sample $I_{n-2}$, wherein $I_n$, $I_{n-1}$, and $I_{n-2}$ are offset from one another by at least one unit interval (UI).

* * * * *